United States Patent
Decker

(10) Patent No.: US 7,614,450 B2
(45) Date of Patent: *Nov. 10, 2009

(54) PUMPING SYSTEM AND METHOD FOR INJECTING A MIXTURE OF LIQUIDS INTO A SUBTERRANEAN FORMATION

(75) Inventor: Randal L. Decker, Midland, TX (US)

(73) Assignee: Team $CO_2$ Holdings, Ltd., Midland, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 12/287,407

(22) Filed: Oct. 10, 2008

(65) Prior Publication Data

US 2009/0038803 A1 Feb. 12, 2009

Related U.S. Application Data

(62) Division of application No. 11/501,570, filed on Aug. 9, 2006, now Pat. No. 7,513,307.

(60) Provisional application No. 60/766,815, filed on Feb. 13, 2006.

(51) Int. Cl.
*E21B 43/25* (2006.01)
*E21B 43/26* (2006.01)

(52) U.S. Cl. .................. 166/279; 166/75.11; 166/90.1; 166/305.1; 166/308.1; 166/308.4

(58) Field of Classification Search ............. 166/75.11, 166/90.1, 268, 279, 302, 305.1, 307, 308.1, 166/308.4, 902; 507/904

See application file for complete search history.

(56) References Cited

U.S. PATENT DOCUMENTS

| | | | |
|---|---|---|---|
| 3,193,014 A | 7/1965 | Armistead | |
| 3,368,627 A * | 2/1968 | Hurst et al. | 166/307 |
| 3,842,910 A | 10/1974 | Zingg et al | |
| 3,970,148 A | 7/1976 | Jones et al. | |
| 4,212,354 A | 7/1980 | Guinn | |
| 4,235,289 A | 11/1980 | Weeter | |
| 4,374,545 A | 2/1983 | Bullen et al. | |
| 4,593,763 A | 6/1986 | Burke | |
| 5,002,125 A | 3/1991 | Phillips et al. | |
| 5,105,843 A | 4/1992 | Condron et al. | |
| 5,312,862 A | 5/1994 | Nielsen et al. | |
| 6,509,300 B1 * | 1/2003 | Gupta | 507/203 |
| 6,988,552 B2 | 1/2006 | Wilson et al. | |
| 7,513,307 B2 * | 4/2009 | Decker | 166/307 |

* cited by examiner

*Primary Examiner*—George Suchfield
(74) *Attorney, Agent, or Firm*—F. Lindsey Scott

(57) ABSTRACT

A system and method to inject a combined hydrocarbon-based liquid stream and a liquid carbon dioxide stream into a subterranean formation via a well using a single high-pressure pump.

19 Claims, 2 Drawing Sheets

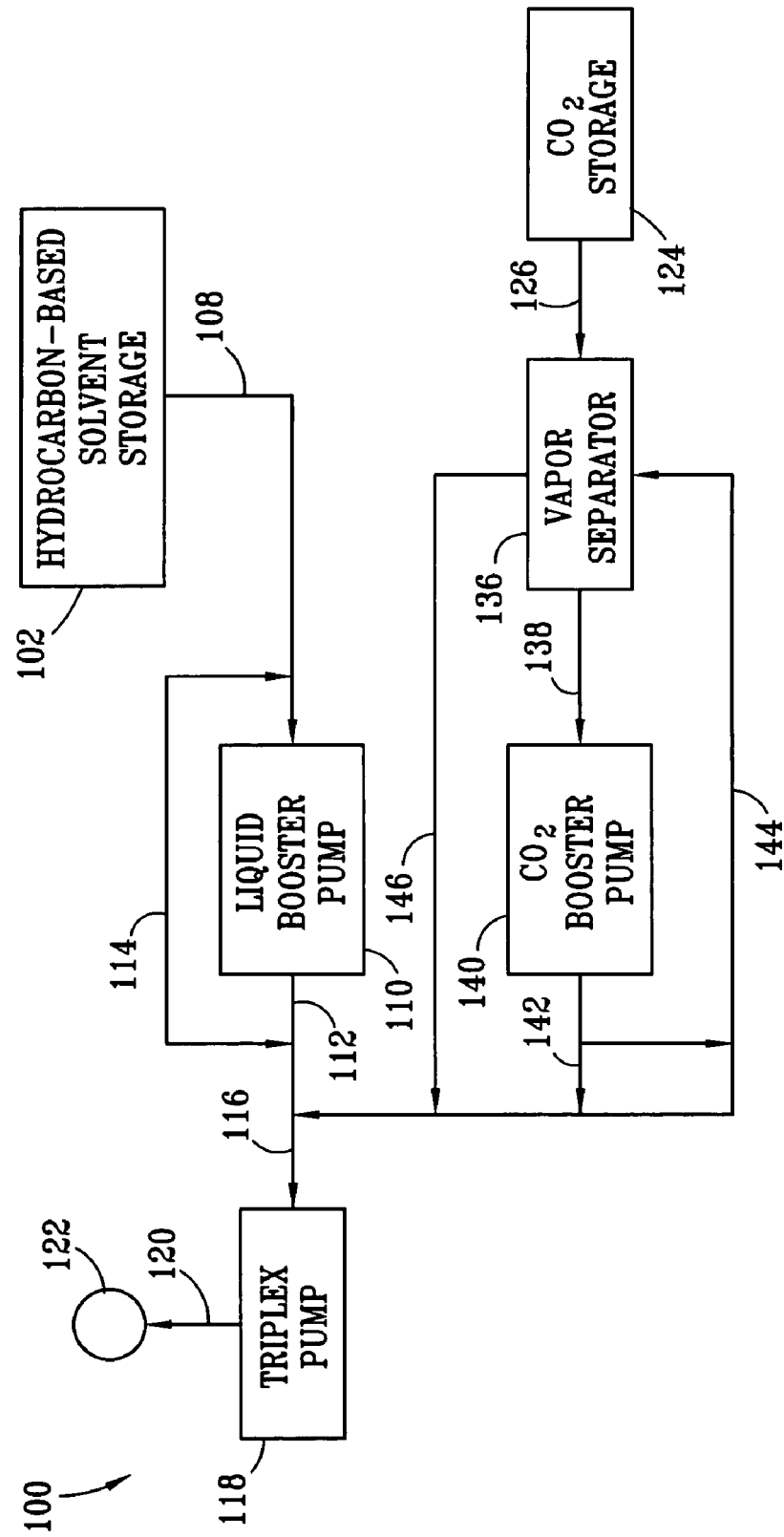

US 7,614,450 B2

PUMPING SYSTEM AND METHOD FOR INJECTING A MIXTURE OF LIQUIDS INTO A SUBTERRANEAN FORMATION

RELATED INVENTION

This is a divisional of application Ser. No.: 11/501,570 filed on Aug. 9, 2006 now U.S. Pat. No. 7,513,307.

This invention is entitled to and hereby claims the benefit of the filing date of Provisional Patent Application Serial No. 60/766,815 filed Feb. 13, 2006 by Randal L. Decker entitled "Liquid $CO_2$ Emulsion Pumping System."

FIELD OF THE INVENTION

The present invention relates to an efficient injection system for injecting a combined aqueous or hydrocarbon-based liquid stream and a liquid carbon dioxide stream via a well into a subterranean formation.

BACKGROUND OF THE INVENTION

In the use of liquid carbon dioxide for injection with various liquid well treating materials, it has been necessary in the past to use two high-pressure pumps; one for the injection of an aqueous or hydrocarbon-based liquid stream and one for the liquid carbon dioxide stream to achieve the required injection and mixing pressures.

These high-pressure pumps, which are large pumps, are typically mounted on heavy duty trucks for movement to a well area. These pumps are typically massive, positive displacement pumps having one or multiple plungers and are used to increase the pressure of injection streams to a pressure suitable for injection into a well up to and at or exceeding fracturing conditions as required. The use of these pumps is expensive since they are subject to a substantial per diem charge as a result of the high cost of the pumps and because such pumps have relatively high maintenance costs.

Accordingly, a more efficient and economical way to inject a stream of liquid carbon dioxide and a liquid stream of aqueous or hydrocarbon-based liquid treating solution into a well at a suitable pressure has been sought.

SUMMARY OF THE INVENTION

The invention comprises a system for efficient injection of a combined hydrocarbon-based liquid stream and a liquid carbon dioxide stream into a well penetrating a subterranean formation; the system consisting essentially of: a liquid booster pump in fluid communication with a source of an aqueous or hydrocarbon-based liquid and effective to increase a pressure in a liquid stream of the hydrocarbon-based liquid to a first selected pressure; a liquid carbon dioxide booster pump in fluid communication with a source of liquid carbon dioxide and effective to increase a pressure in a stream of liquid carbon dioxide to a second selected pressure; and, a high-pressure pump in fluid communication with the liquid booster pump and the liquid carbon dioxide booster pump and adapted to receive and combine the liquid stream of hydrocarbon-based liquid and the stream of liquid carbon dioxide and increase a pressure of the combined stream to a pressure suitable for injection into the well.

The invention further comprises a method for injection of a combined hydrocarbon-based liquid stream and a liquid carbon dioxide stream into a well penetrating a subterranean formation, the method consisting essentially of: increasing the pressure of the hydrocarbon-based liquid stream to 550 psia, up to 650 psia, in a liquid booster pump; increasing the pressure of a stream of liquid carbon dioxide to about 550 psia, up to 650, psia in a liquid carbon dioxide booster pump; and, passing the liquid carbon dioxide stream and the hydrocarbon-based liquid stream to a high-pressure pump wherein the streams are combined and wherein the pressure of the combined streams is increased to a pressure sufficient to inject the combined streams into the well.

The invention further comprises a method for injection of a combined hydrocarbon-based liquid stream and a liquid carbon dioxide stream into a subterranean formation via a well by passing the combined aqueous or hydrocarbon-based liquid stream and the liquid carbon dioxide stream to a high-pressure pump where the liquid streams are combined and wherein the pressure of the combined streams is increased to a pressure greater than 650 psia.

DESCRIPTION OF PREFERRED EMBODIMENTS

Figure 1:
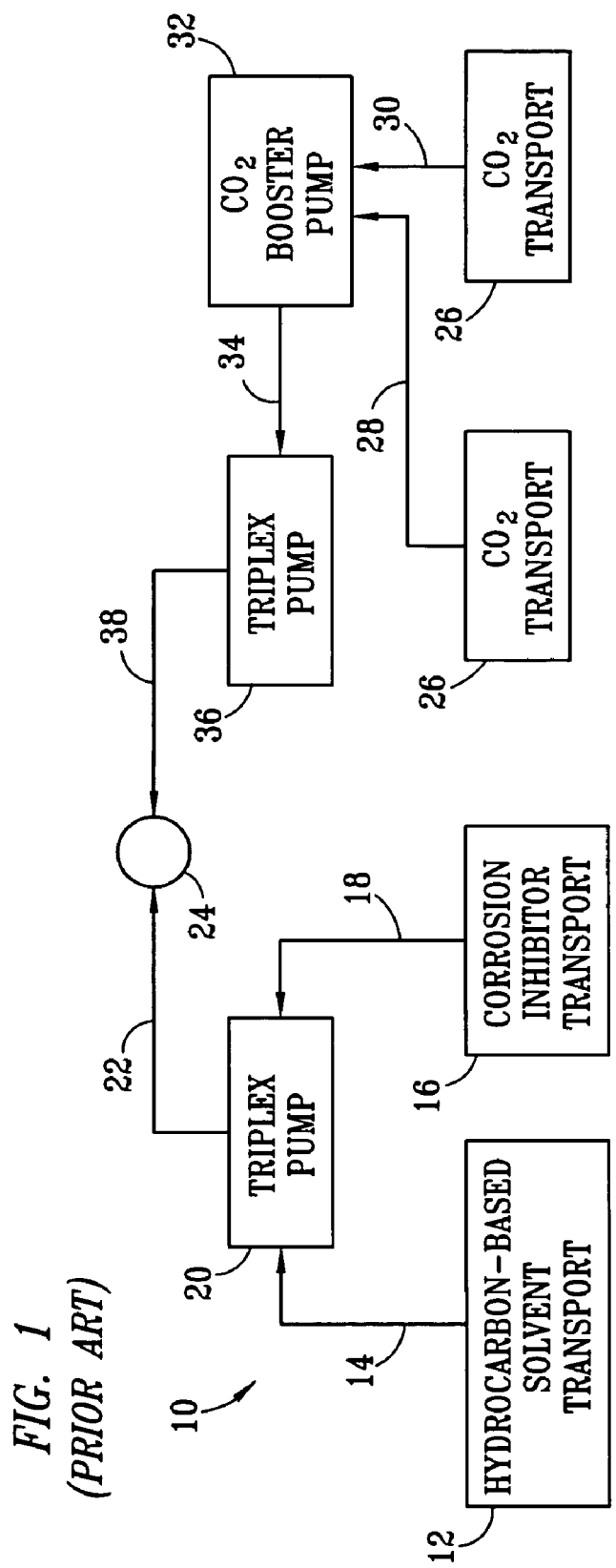
FIG. 1 is a schematic diagram of a prior art system for injecting a mixture of a treating solution and carbon dioxide; and, FIG. 2 shows a schematic diagram of an embodiment of the present invention.

In the discussion of the Figures and embodiments, various features such as pumps, valves and the like necessary to achieve the flows required and discussed have not been shown for simplicity since such features are considered to be well known to those skilled in the art.

A prior art system 10 is shown in FIG. 1.

In FIG. 1 a hydrocarbon-based liquid source is shown as an HCL transport 12 and a hydrocarbon-based additive is shown as a corrosion inhibitor transport 16. These transports are typically large tanker trucks or the like which can be moved to a well site for treatment of the well. Typically these are trucks which discharge their cargos at a pressure from atmospheric pressure, to a booster pump (not shown) that increases the liquid pressure to about 50-150 psia as shown with the solvent and corrosion inhibitor solution being passed through lines 14 and 18 to a high-pressure triplex pump 20. The high-pressure pump 20 increases the pressure of the streams to a pressure sufficient for discharge into a well 24 via a line 22.

Liquid carbon dioxide is typically delivered by trucks, shown as CO2 transports 26 ($CO_2$ transports) and is typically supplied at about 250-300 psia pressure. The carbon dioxide is typically passed to a liquid carbon dioxide booster pump 32 through one of lines 28 and 30. Booster pump 32 increases the pressure of the liquid carbon dioxide stream by about 50 to about 75 psia and passes it via a line 34 to a high-pressure triplex pump 36 which increases the pressure of the carbon dioxide stream and discharges the liquid carbon dioxide stream through a line 38 to well 24. The streams are mixed in well 24 as they pass downwardly through the well.

In FIG. 2 a schematic diagram of an embodiment 100 of the present invention is shown wherein hydrocarbon-based liquid is stored at atmospheric pressure in a vessel 102. The liquid carbon dioxide is stored at 250-300 psia. In this embodiment, liquid carbon dioxide is stored in a vessel 124 ($CO_2$ storage) and is produced through a line 126 and passed through a vapor separator 136 and then through a line 138 to a CO2 booster pump 140 where it is compressed to a pressure from about 550 psia, up to about 600 psia. The stream compressed in booster pump 140 is passed through a line 142 and then through a line 116 to a high-pressure triplex pump 118. The high-pressure pump then increases the pressure in this stream along with the hydrocarbon-based liquid stream for injection through a line 120 to a well 122.

The hydrocarbon-based liquid is stored in storage 102 and passed via a line 108 to a liquid booster pump 110 where its pressure is increased to a pressure of about 600 psia and then combined via a line 112 with the stream from line 142 and fed to a high-pressure pump 118 via line 116. Liquid booster pump 110 also is in fluid communication with a recycle loop comprising a line 112 and a line 114 so that the output from liquid booster pump 110 can be recycled if desired in whole or in part for pressure and flow volume control.

Vapor separator 136 operates to remove accumulated vapor that has been formed by the absorption of heat as the liquid carbon dioxide has been moved from storage 124 via line 126. The vapor is vented to the atmosphere from the top of separator 136, thereby preventing the booster pump 140 and high-pressure pump 118 from cavitating. In the event that the liquid $CO_2$ rate must be reduced to pump 118, a portion of the stream in line 142 can be diverted through a line 144 and can be re-cycled through vapor separator 136 which will remove accumulated vapor and aid in controlling a liquid $CO_2$ pump 140 rate and pressure from pump 140 to high-pressure pump 118. The stream is then passed through a line 146 back to line 142. This enables the operation of vapor separator 136 to separate vapor from the liquid carbon dioxide as required. As indicated, it is contemplated that the vapor separator will contain only relatively small volumes of carbon dioxide vapor at any given time since substantial amounts of carbon dioxide liquid are passing through these vessels.

This embodiment allows the liquid carbon dioxide to be in storage at 250-300 psia and allows for the hydrocarbon-based liquid to be in storage at atmospheric pressure. According to the present invention, the hydrocarbon-based solvent and the carbon dioxide are supplied to a single high-pressure pump at a pressure of about 550 psia, up to 650 psia, and at preferably about 600 psia. In the past it has been considered necessary to have a high-pressure pump for each of the hydrocarbon-based liquid and the liquid carbon dioxide.

According to the present invention only a single high-pressure pump is used. This results in a substantial increase in the process efficiency since better emulsification is achieved. It also results in a substantial reduction of expense in that only one high-pressure pump is required to be maintained and operated on site. The resulting emulsions are formed in the high-pressure pump and the emulsion is pumped into the well at a pressure great than 650 psia.

While the invention has been discussed above by reference to aqueous hydrochloric acid as a treating solution, it should be understood that the acid solution may contain methanol and other additives. While the presence of methanol is optional it is desirable in many instances that the methanol be present in an amount from about 5 to about 25 weight percent in the treating liquid. Further the invention can be used to inject not only aqueous acid but alternatively hydrocarbon-based liquids such as organic solvents, scale inhibitors, corrosion inhibitors and the like into the well. The only real limitation on the use of the treating liquid is that it be liquid when mixed the liquid carbon dioxide.

As well known to those skilled in the art, whatever arrangement is used to provide the liquid carbon dioxide to the high-pressure pump at the desired pressure must maintain the liquid carbon dioxide under suitable temperature and pressure conditions to maintain it in a liquid state. Such conditions are well known to those skilled in the art.

While the embodiments shown are preferred, it is considered necessary for the practice of the present invention that the carbon dioxide be delivered in a liquid form at a pressure from about 550 psia, up to 650 psia, to the high-pressure pump along with the aqueous solution which must be delivered at the same or a comparable pressure and at a temperature which does not result in vaporization of the liquid carbon dioxide. These streams may be introduced in mixture or alone into the high-pressure pump. In either event the resulting emulsion is readily pumped by the high-pressure pump into the well as shown, for instance in FIG. 2, via line 120 into well 122.

As mentioned previously, the high-pressure pumps are typically large, positive displacement pumps having from 1 to 5 or more plungers which are relatively high maintenance and high expense pumps for use because of their ability to generate the extreme pressures used in fracturing operations and the like. These positive displacement pumps are suitable as the high-pressure pump in the present invention.

Multi-stage centrifugal pumps may be used for similar applications but are not typically used or preferred for fracturing operations. They are suitable for use as the high-pressure pump in the present invention so long as they are capable of mixing the aqueous solution and the liquid carbon dioxide and injecting the resulting mixture into a well at a pressure greater than about 650 psia.

While typical and preferred operating conditions for the invention have been described above, the hydrocarbon-based liquid solution could be passed to the high-pressure pump at a higher or lower pressure and the higher-pressure pump is capable of compressing the mixture to pressures much higher than 650 psia. The liquid booster pumps and the feed pumps, if used, may be centrifugal pumps, multi-stage centrifugal pumps and the like as required to achieve the desired pressure increases. The operation of such pumps is much less expensive than for the high-pressure pumps and the maintenance requirements for such pumps are much lower. The preferred pressures discussed above may be varied so long as the liquid streams are mixed as liquids and so long as the carbon dioxide is passed to the high pressure pump as a liquid.

By the present invention, the use of a second high-pressure pump has been omitted and improved mixing and operational efficiency has been achieved in the delivery of the treating liquid/liquid carbon dioxide mixture into the well.

While the present invention has been described by reference to certain of its preferred embodiments, it is pointed out that the embodiments described are illustrative rather than limiting in nature and that many variations and modifications are possible within the scope of the present invention. Many such variations and modifications may be considered obvious and desirable by those skilled in the art based upon a review of the foregoing description of preferred embodiments.

What is claimed is:

1. A system for efficient injection of a combined hydrocarbon-based liquid stream and a liquid carbon dioxide stream into a well penetrating a subterranean formation; the system consisting essentially of:

a) a liquid booster pump in fluid communication with a source of a hydrocarbon-based liquid and effective to increase a pressure of a first liquid stream to a first selected pressure;

b) a carbon dioxide booster pump in fluid communication with a source of liquid carbon dioxide and effective to increase a pressure of a first stream of liquid carbon dioxide to a second selected pressure; and, c) a high-pressure pump in fluid communication with the liquid booster pump and the carbon dioxide booster pump and adapted to receive and combine the first liquid stream and the first stream of liquid carbon dioxide and increase a pressure of the combined stream to a pressure suitable for injection into the well.

2. The system of claim 1 wherein the first selected pressure is from about 550 up to 650 psia.

3. The system of claim 1 wherein the first selected pressure is about 600 psia.

4. The system of claim 1 wherein the first selected pressure and the second selected pressure are about the same.

5. The system of claim 1 wherein the system includes a vapor separator in fluid communication with the source of liquid carbon dioxide and the carbon dioxide booster pump.

6. The system of claim 1 wherein the high-pressure pump is a positive displacement pump or a multi-phase centrifugal pump and wherein the high-pressure pump is adapted to produce a pressure of the combined stream greater than 650 psia.

7. The system of claim 6 wherein the high-pressure pump is a positive displacement pump.

8. The system of claim 6 wherein the high-pressure pump is a multi-stage centrifugal pump.

9. A method for injection of a combined hydrocarbon-based liquid and a liquid carbon dioxide stream into a well penetrating a subterranean formation, the method consisting essentially of:
   a) increasing the pressure of a hydrocarbon-based liquid stream to about 550 up to 650 psia in a liquid booster pump;
   b) increasing the pressure of a stream of liquid carbon dioxide to a pressure from about 250 psia up to 650 psia in a carbon dioxide booster pump; and,
   c) passing the liquid carbon dioxide stream and the hydrocarbon-based liquid stream to a high-pressure pump wherein the streams are combined and wherein the pressure of the combined streams is increased to a pressure sufficient to inject the combined streams into the well.

10. The method of claim 9 wherein the hydrocarbon-based liquid stream comprises a hydrocarbon-based solvent.

11. The method of claim 9 wherein the stream of liquid carbon dioxide and the hydrocarbon-based liquid are passed to the high-pressure pump at about the same pressure.

12. The method of claim 9 wherein the hydrocarbon-based stream is selected from the group consisting of an organic solvent, a scale inhibitor or a corrosion inhibitor.

13. The method of claim 9 wherein the combined streams contain from about 5 to about 95 weight percent carbon dioxide.

14. The method of claim 9 wherein the high-pressure pump is a positive displacement pump or a multi-phase centrifugal pump and wherein the high-pressure pump is adapted to produce a pressure of the combined stream greater than 650 psia.

15. The method of claim 9 wherein the high-pressure pump is a positive displacement pump.

16. The method of claim 9 wherein the high-pressure pump is a multi-stage centrifugal pump.

17. A method for efficient injection of a combined hydrocarbon-based liquid stream and a liquid carbon dioxide stream into a subterranean formation; the method consisting essentially of:
   a) passing the liquid hydrocarbon-based stream to a high-pressure pump;
   b) passing the liquid carbon dioxide stream to the high-pressure pump; and,
   c) mixing the liquid hydrocarbon-based stream and the liquid carbon dioxide stream in the high-pressure pump to produce a combined liquid stream and increasing the pressure of the combined liquid stream to a pressure sufficient for injection into the subterranean formation.

18. The method of claim 17 wherein the high-pressure pump is a positive displacement pump or a multi-phase centrifugal pump and wherein the high-pressure pump is adapted to produce a pressure of the combined stream greater than 650 psia.

19. The method of claim 17 wherein the high-pressure pump is a positive displacement pump.

* * * * *